(12) United States Patent
Kim et al.

(10) Patent No.: US 11,680,606 B2
(45) Date of Patent: Jun. 20, 2023

(54) COUPLER AND MOTOR ASSEMBLY INCLUDING SAME

(71) Applicant: LG INNOTEK CO., LTD., Seoul (KR)

(72) Inventors: Yong Joo Kim, Seoul (KR); Young Gu Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 754 days.

(21) Appl. No.: 16/462,133

(22) PCT Filed: Nov. 10, 2017

(86) PCT No.: PCT/KR2017/012711
§ 371 (c)(1),
(2) Date: May 17, 2019

(87) PCT Pub. No.: WO2018/101642
PCT Pub. Date: Jun. 7, 2018

(65) Prior Publication Data
US 2019/0331168 A1    Oct. 31, 2019

(30) Foreign Application Priority Data

Dec. 2, 2016  (KR) .................. 10-2016-0163441

(51) Int. Cl.
*F16D 1/06* (2006.01)
*B21K 1/14* (2006.01)
(Continued)

(52) U.S. Cl.
CPC .................. *F16D 1/06* (2013.01); *B21K 1/14* (2013.01); *H02K 7/003* (2013.01); *H02K 7/116* (2013.01);
(Continued)

(58) Field of Classification Search
CPC ... F16D 1/06; F16D 1/108; F16D 3/70; F16D 3/12; F16D 3/68; F16D 3/04; B21K 1/14;
(Continued)

(56) References Cited

U.S. PATENT DOCUMENTS 2,891,395 A    6/1959  Chater
4,914,331 A *  4/1990  Lewis .................. H02K 7/1004
                                                310/90
(Continued)

FOREIGN PATENT DOCUMENTS

CN    103580374 A    2/2014
DE    1450191 A1     3/1969
(Continued)

*Primary Examiner* — John K Kim
(74) *Attorney, Agent, or Firm* — Birch, Stewart, Kolasch & Birch, LLP (57) ABSTRACT

The present invention provides a coupler comprising: an inner insertion part including a through-hole; and an outer support part for encompassing the outside of the inner insertion part, wherein the inner insertion part includes a connection groove through which the outer support part passes, the outer support part includes at least one projection part protruding in the center direction of the through-hole, and the projection part includes a groove part.

15 Claims, 6 Drawing Sheets

(51) Int. Cl.
*H02K 7/00* (2006.01)
*H02K 7/116* (2006.01)
*B29L 31/30* (2006.01)
*B29L 31/00* (2006.01)
*F16D 1/108* (2006.01)
*F16D 3/70* (2006.01)

(52) U.S. Cl.
CPC . *B29L 2031/3055* (2013.01); *B29L 2031/749* (2013.01); *F16D 1/108* (2013.01); *F16D 3/70* (2013.01)

(58) Field of Classification Search
CPC .................. H02K 7/003; H02K 7/116; B29L 2031/3055; B29L 2031/749
USPC ....................................................... 310/75 D
See application file for complete search history.

(56) References Cited

U.S. PATENT DOCUMENTS

| | | | |
|---|---|---|---|
| 9,257,885 B2 * | 2/2016 | Kato | H02K 11/215 |
| 2002/0047388 A1 * | 4/2002 | Ibata | H02K 7/061 |
| | | | 310/90 |
| 2010/0004066 A1 * | 1/2010 | Kowalski | F16D 3/06 |
| | | | 464/161 |
| 2012/0043844 A1 * | 2/2012 | Bailey | D06F 37/304 |
| | | | 310/156.12 |
| 2013/0102396 A1 | 4/2013 | Zhou et al. | |
| 2013/0270972 A1 * | 10/2013 | Kato | H02K 11/215 |
| | | | 310/68 B |
| 2014/0028133 A1 * | 1/2014 | Park | H02K 7/108 |
| | | | 310/78 |
| 2016/0352184 A1 * | 12/2016 | Kim | H02K 7/003 |
| 2019/0331168 A1 * | 10/2019 | Kim | H02K 7/003 |

FOREIGN PATENT DOCUMENTS

| | | |
|---|---|---|
| JP | 2001-173759 A | 6/2001 |
| JP | 2005-308199 A | 11/2005 |
| JP | 2013-139851 A | 7/2013 |
| JP | 2014-27874 A | 2/2014 |
| JP | 2016-20718 A | 2/2016 |
| KR | 10-2009-0005565 A | 1/2009 |
| KR | 10-2012-0109124 A | 10/2012 |
| KR | 10-2014-0017069 A | 2/2014 |

* cited by examiner

COUPLER AND MOTOR ASSEMBLY INCLUDING SAME

CROSS REFERENCE TO RELATED APPLICATIONS

This application is the National Phase of PCT International Application No. PCT/KR2017/012711, filed on Nov. 10, 2017, which claims priority under 35 U.S.C. 119(a) to Patent Application No. 10-2016-0163441, filed in the Republic of Korea on Dec. 2, 2016, all of which are hereby expressly incorporated by reference into the present application.

TECHNICAL FIELD

An embodiment relates to a coupler manufactured using both a forging method and an injection method and a motor assembly including the same.

BACKGROUND ART

A power steering device of a vehicle is a device configured to reduce an angular rotation operating force of a steering wheel, and a power steering method using a hydraulic pressure has been continuously in use. Recently launched vehicles are equipped with motor driven power steering (MDPS) devices to change the steering force according to the driving speed.

Generally, an electric power steering (EPS) motor is attached to a motor driven power steering (MDPS) column to assist a driver's steering.

When the EPS motor is coupled to a shaft of a decelerator of the column to generate torque and drive the decelerator, a member referred to as a "coupler" should be used.

However, in a coupler manufactured by a conventional forging method, it is difficult to implement a shape due to the characteristics of the forging method, and when a location of the coupler is twisted in a manufacturing process, there is a problem that a coupling force with a shaft is difficult to ensure.

Further, a problem in which a noise occurs due to surface contact between the other object and the coupler when the motor is driven has also been indicated.

DISCLOSURE

Technical Problem

An embodiment is directed to providing a coupler manufactured using both a forging method and an injection method.

Problems to be solved by the present invention are not limited to the above-described problems, and purposes and effects understood from solutions and embodiments which will be described below are also included.

Technical Solution

One aspect of the present invention provides a coupler including: an inner insertion part including a through hole; and an outer support part configured to surround the outside of the inner insertion part, wherein the inner insertion part includes a connection groove through which the outer support part passes, the outer support part includes at least one projection part configured to protrude in a center direction of the through hole, and the projection part includes a groove part.

The inner insertion part may include a plate-shaped plate having a predetermined thickness and a protruding part in which the through hole is formed.

The plate may have a polygonal structure.

The polygonal structure of the plate may be provided in a polygonal shape having a multiple of the number of the projection parts.

An outermost point of the plate may be located under the projection part.

Linear gear teeth may be formed on a through surface forming the through hole.

A spiral screw thread may be formed on the through surface forming the through hole.

The outer support part may include a cylindrical outer wall, and the projection part may protrude in an inward direction from the outer wall.

The projection part and the neighboring projection parts may be disposed at the same interval on the outer support part.

An upper surface of the projection part may have an inclined portion which is inclined downward from the projection part.

A side surface of the projection part may be formed of an involute curve.

The inner insertion part may be manufactured using a forging method and the outer support part may be manufactured using an injection method.

Another aspect of the present invention provides a motor assembly including: a rotary shaft; a rotor including a hole in which the rotary shaft is disposed; a stator disposed at an outer side of the rotor; a housing configured to accommodate the rotor and the stator; and a coupler coupled to the rotary shaft, wherein the coupler includes an inner insertion part including a through hole and an outer support part configured to surround the outside of the inner insertion part. The inner insertion part includes a connection groove through which the outer support part passes, the outer support part includes at least one projection part configured to protrude in a center direction of the through hole, and the projection part includes a groove part.

Advantageous Effects

According to an embodiment, both a forging method and an injection method can be used to implement a detailed shape and increase a coupling force.

Further, an additional coupling structure can be added to an inner diameter of a coupler to ensure reliability of the coupling force.

In addition, a structure of a coupling surface can be implemented as an involute shape to reduce a noise which occurs when a rotating direction is changed.

Various useful advantages and effects of the present invention are not limited to the above and may be relatively easily understood in a process of describing exemplary embodiments of the present invention.

MODES OF THE INVENTION

Since the present invention may be variously changed and have various embodiments, particular embodiments will be exemplified and described in the drawings. However, the embodiments of the present invention are not limited to the particular embodiments and include all changes, equivalents, and substitutes within the spirit and the scope of the embodiments.

Further, it should be understood that, although the terms "first," "second," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

Terms used in the present invention are used only to describe the particular embodiments and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

In the description of the embodiments, when one element is disclosed to be formed "on" or "under" another element, the terms "on" or "under" include both a case in which the two elements are in direct contact with each other and a case in which at least one other element is indirectly disposed between the two elements to be formed. Further, when the terms "on" or "under" is expressed, a meaning of an upward direction and a downward direction with respect to one element may also be included.

Hereinafter, the embodiments will be described in detail with reference to the accompanying drawing drawings, the same reference numerals are applied to the same or corresponding elements, and redundant description thereof will be omitted.

FIGS. 1 to 8 clearly illustrate only main characteristic parts to conceptually and clearly understand the present invention, and accordingly, an explanatory diagram may be variously modified, and the scope of the present invention does not have to be limited according to particular shapes shown in the drawings.

Figure 1:
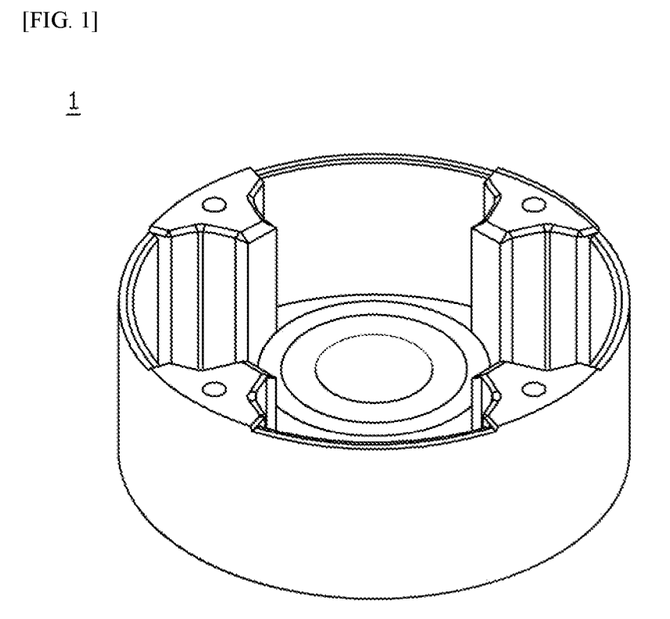
FIG. 1 is a perspective view of a coupler according to an embodiment of the present invention.
Figure 2:
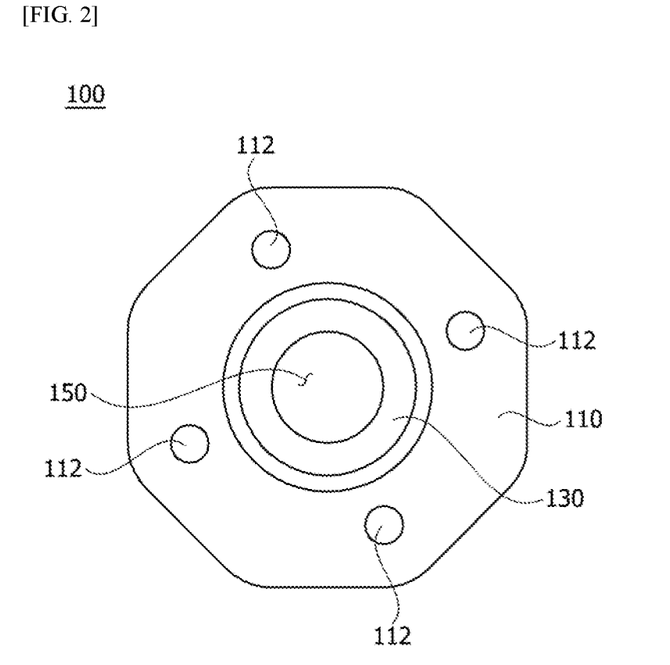
FIG. 2 is a view illustrating a configuration of an inner insertion part which is an element in FIG. 1.
Figure 3:
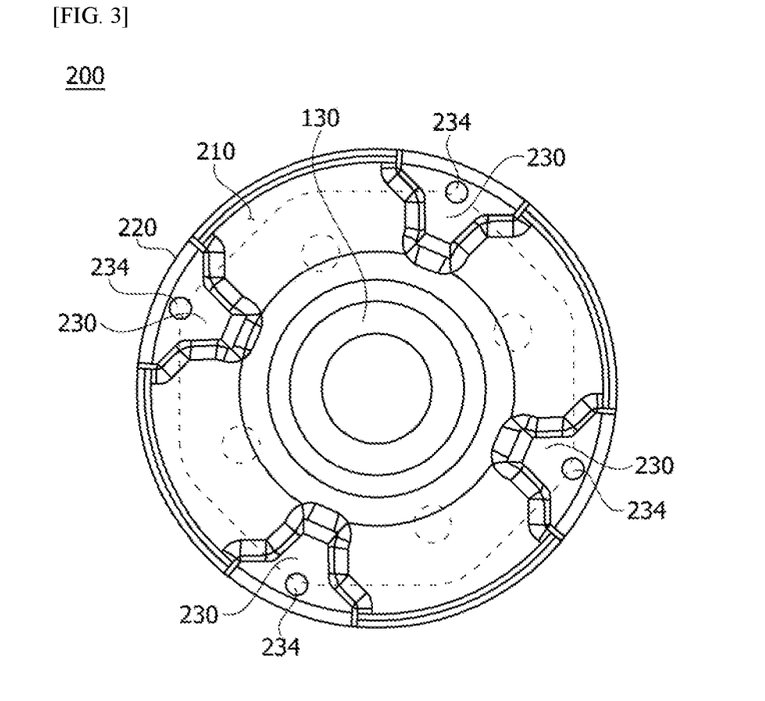
FIG. 3 is a projection view illustrating a state in which the inner insertion part in FIG. 1 is inserted into an outer support part.
Figure 4:
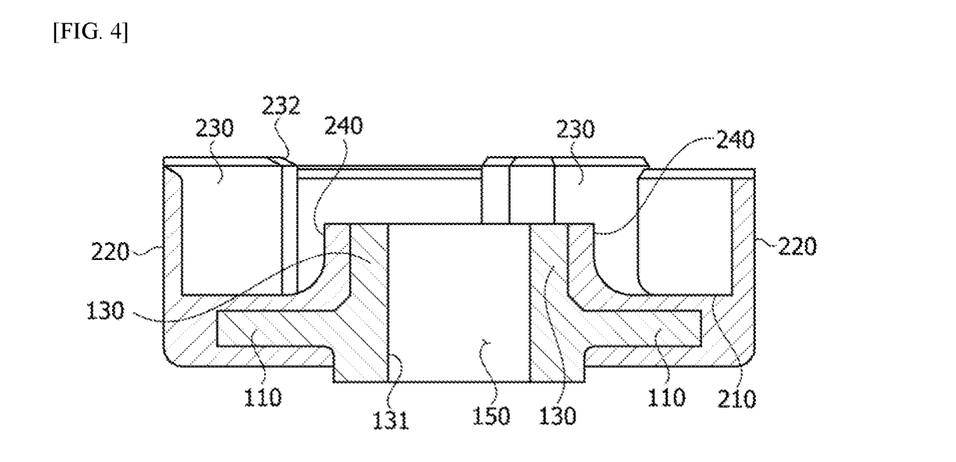
FIG. 4 is a cross-sectional view of FIG. 1.

FIG. 1 is a perspective view of a coupler according to an embodiment of the present invention, FIG. 2 is a view illustrating a configuration of an inner insertion part which is an element of the present invention, FIG. 3 is a projection view illustrating a state in which the inner insertion part is inserted into an outer support part, and FIG. 4 is a cross-sectional view of the coupler.

Referring to FIGS. 1 to 4, a coupler 1 according to the embodiment of the present invention includes an inner insertion part 100 and an outer support part 200.

The inner insertion part 100 may include a plate 110 and a protruding part 130 and may be formed of a metal material.

The plate 110 may be provided in a plate shape having a predetermined thickness and may be inserted into the outer support part 200 not to be exposed to the outside when coupled to the outer support part 200. The plate 110 may have a polygonal structure to prevent the plate 110 from slipping in the outer support part 200 when the plate 110 is inserted into the outer support part 200 and a shaft (not shown) is connected to a through hole 150 to rotate.

The plate 110 may have a polygonal shape. The polygonal structure may be provided in a polygonal shape having a multiple of the number of projection parts 230. As an embodiment, when four projection parts 230 are configured, the plate 110 may be provided in an octagonal structure to increase a supporting force and uniformly distribute an applied load when the load is applied to the projection parts 230 of the outer support part 200. Although an example of the octagonal structure is described in the drawing, a dodecagon may be formed when the number of the projection parts 230 is four.

Outermost points of the plate 110 having the polygonal structure may be located under the projection parts 230. Accordingly, a large weight is applied to the projection parts 230 when the projection parts 230 are coupled to another object. In this case, the outermost points of the plate 110 located at a lower side may increase the supporting force of the projection parts 230. Further, when the outermost points are located under the projection parts 230, since the number of the projection parts 230 and the number of the outermost points located between the projection parts 230 are entirely the same, the load may be stably distributed.

As an embodiment, the projection part 230 and the neighboring projection parts 230 may be disposed at the same interval on the outer support part 200, and the inner insertion part 100 may be provided in a polygonal structure having two times the number of the projection parts 230 disposed on the outer support part 200.

In the above case, the outermost points of the plate 110 having a regular polygonal structure may be located under the projection parts 230, and the neighboring outermost points may be located between the projection part 230 and the projection part 230. In this case, since the outermost points are located at the same angle in the regular polygonal structure and are each located at a center between the projection part 230 and the projection part 230, torque which acts on the projection parts 230 may be stably dispersed.

Further, at least one connection groove 112 is formed in the inner insertion part 100, and the outer support part may be connected to the connection groove 112. The connection groove 112 may increase a coupling force when connecting the outer support part 200 and the inner insertion part 100 using an injection method.

As an embodiment, a plurality of connection grooves 112 may be formed in the plate 110 as a plurality of through holes. When the connection grooves 112 are formed as the plurality of through holes, elements forming the outer support part 200 may be connected to the connection grooves 112 through inner sides of the through holes. In this case, a power transferring force due to rotation may be increased.

Although an example in which the connection grooves 112 are formed as the through holes is described in the drawing, the present invention is not limited thereto, and the connection grooves 112 may be provided to protrude to increase the coupling force with the outer support part 200.

The protruding part 130 may be provided to protrude from one area in a center of the plate 110, and a through hole 150 connected to the shaft (not shown) may be formed in the protruding part 130. As an embodiment, the protruding part 130 may share a center with the plate 110 having the polygonal structure and may be provided in a pipe shape in which the through hole 150 is formed.

The outer support part 200 may include an accommodation part 210, an outer wall 220, and a projection part 230. The outer support part 200 may be connected to surround the outside of the inner insertion part 100.

One area of the inner insertion part 100 is inserted into the accommodation part 210, and the accommodation part 210 may form a lower surface of the outer support part 200. The plate 110 of the inner insertion part 100 may be inserted into the accommodation part 210. As an embodiment, an outer protruding part 240, into which the plate 110 is inserted and which is configured to come into contact with an outer surface of the protruding part 130, may be connected to the accommodation part 210. In this case, an area in which the outer protruding part 240 comes into contact with the protruding part 130 is not limited.

The outer wall 220 is formed to be connected to an end portion of the accommodation part 210 and to protrude to one side. As an embodiment, the outer wall 220 may form an inner space accommodating one end portion when coupled to the other object and may support the projection parts 230. A shape of the outer wall 220 may be transformed according to a shape of the coupled other object and is not limited to the shape in the drawing.

At least one projection part 230 configured to protrude in an inward direction from the outer wall 220 may be disposed on the outer wall 220. The plurality of projection parts 230 may be provided to stably support coupling with the other object and be located to be spaced apart from each other at the predetermined interval with the neighboring projection part 230 to stably support the load and torque.

At least one groove part 234 may be formed in the projection part 230. When the outer support part 200 is formed through the injection method, the projection part 230 may have a drying problem due to a thickness thereof. In order to prevent the above, the groove part 234 may be formed in one area of the projection part 230. As an embodiment, the groove part 234 may be formed in a downward direction from the upper portion of the projection part 230 and located in a center portion of the projection part 230.

An inclined portion 232 inclined downward from the projection part 230 may be formed on an upper surface of the projection part 230. The inclined portion 232 may facilitate the engagement of the projection part 230 with the other object.

A process of manufacturing the coupler 1 of present invention will be described below with reference to FIGS. 1 to 4.

The inner insertion part 100 coupled to the shaft is formed of a metal material and manufactured through a forging method to prevent damage due to a rigidity difference in the case in which a different material is used in coupling to the shaft.

Further, the inner insertion part 100 is located at a predetermined location and the outer support part 200 is formed through injection. Accordingly, since the shaft and the connection groove 112 may ensure rigidity and the shape of the projection part 230 coupled to the other object may be easily transformed, an engaging force may be increased.

Figure 5:
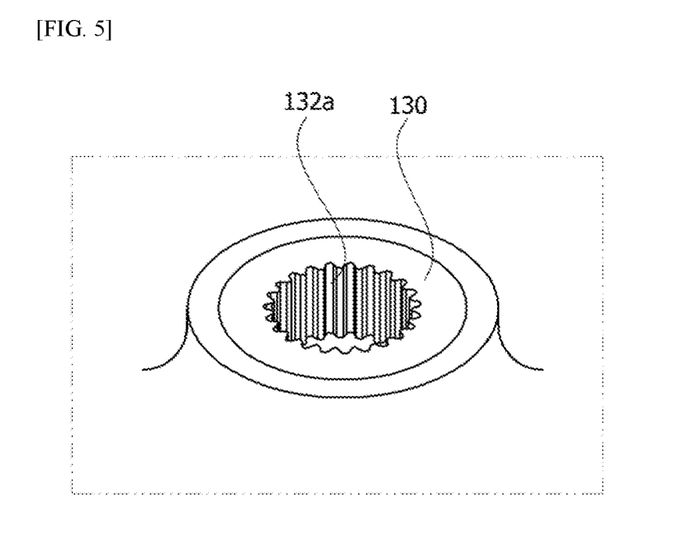
FIGS. 5 and 6 are views illustrating an embodiment of the inner insertion part in FIG. 1.
Figure 6:
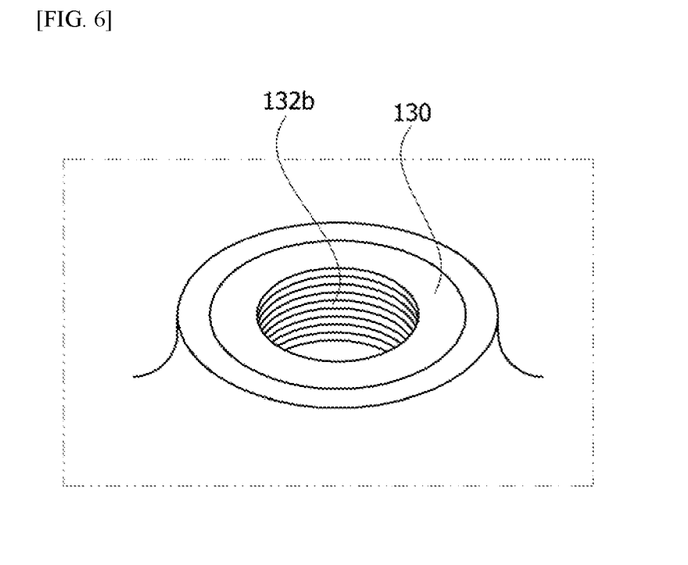

FIGS. 5 and 6 are views illustrating an embodiment of the inner insertion part which is an element of the present invention. Since the through hole 150 coupled to the shaft (not shown) is pressed surface-to-surface when a straight-shaped shaft is coupled to the through hole 150, tolerance management is difficult d. Further, when the shaft is inserted, slip may occur.

In order to prevent the above, elements configured to prevent slipping of the through hole 150 may be provided.

FIG. 5 illustrates a case in which linear gear teeth 132a are provided in a longitudinal direction of the through hole 150 on a through surface 131 forming the through hole 150. In this case, the gear teeth 132a may be formed to be coupled to each other in a matching structure on an outer circumferential surface of the shaft (not shown), and a cylindrical pillar portion may be located to be inserted into the gear teeth 132a by forced fitting.

FIG. 6 illustrates a case in which a spiral-shaped screw thread 132b is provided on the through surface 131 forming the through hole 150. The shaft (not shown) may have the screw thread 132b formed on the outer circumferential surface thereof to be screw-coupled to the inner insertion part 100.

The shaft and the through hole 150 may be additionally fixed to a bonding surface through welding to prevent separation after being coupled to each other.

Figure 7:
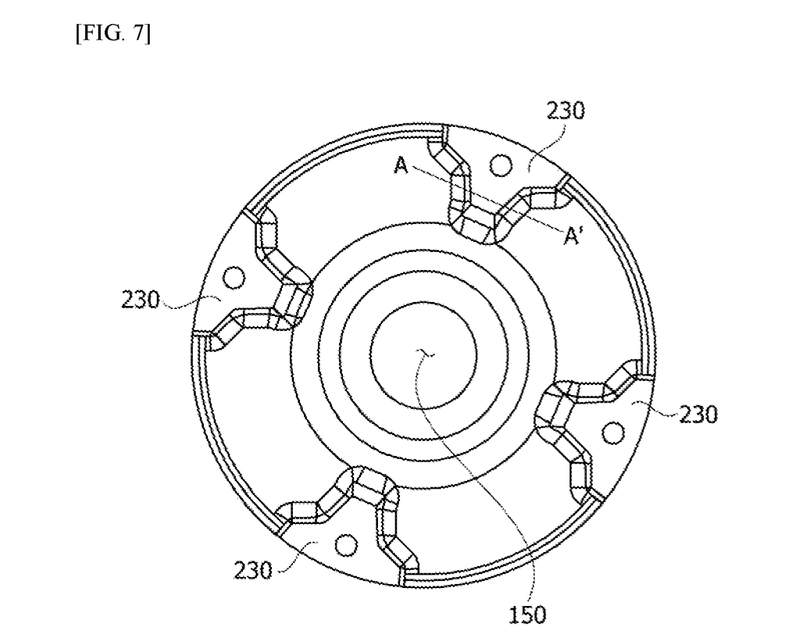
FIGS. 7 and 8 are views illustrating a shape of a projection part which is an element in FIG. 1.
Figure 8:
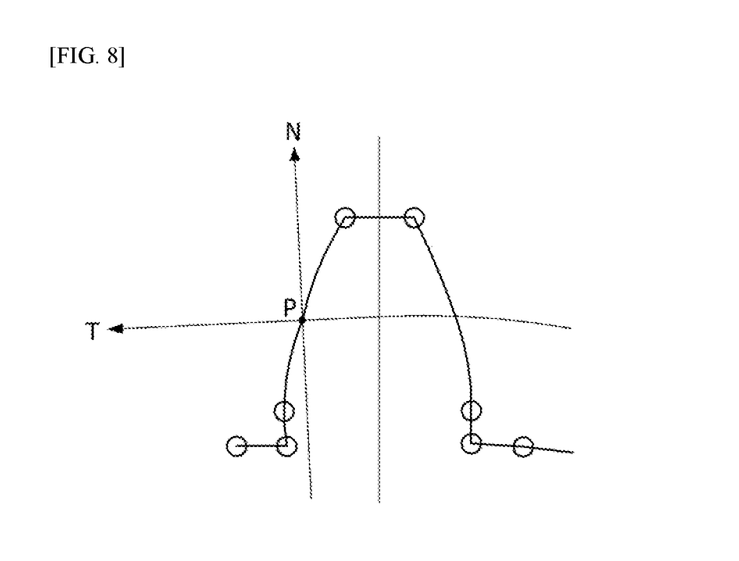

FIGS. 7 and 8 are views illustrating the shape of the projection part which is an element in FIG. 1.

The projection part 230 may have a side surface provided in the shape of a curved surface and may be coupled to the other object to be inserted thereinto. As an embodiment, a side surface of the projection part 230 may be formed in an involute shape. A curve provided by an involute curve may be bonded to the other object point-to-point.

A conventional coupler has a structure which comes into contact with the other object surface-to-surface. In this case, a rotating direction of a motor is changed and noises are generated from a coupler surface of the other object and a coupler surface of the motor. However, since the projection part 230 provided with the involute curve comes into point contact with the other object, occurrence of noises during a change of the direction of the motor may be reduced.

Meanwhile, hereinafter, a motor assembly including a coupler according to another embodiment of the present invention will be described with reference to the accompanying drawings. However, the description of the same elements as those described in the coupler according to an embodiment of the present invention will be omitted.

Figure 9:
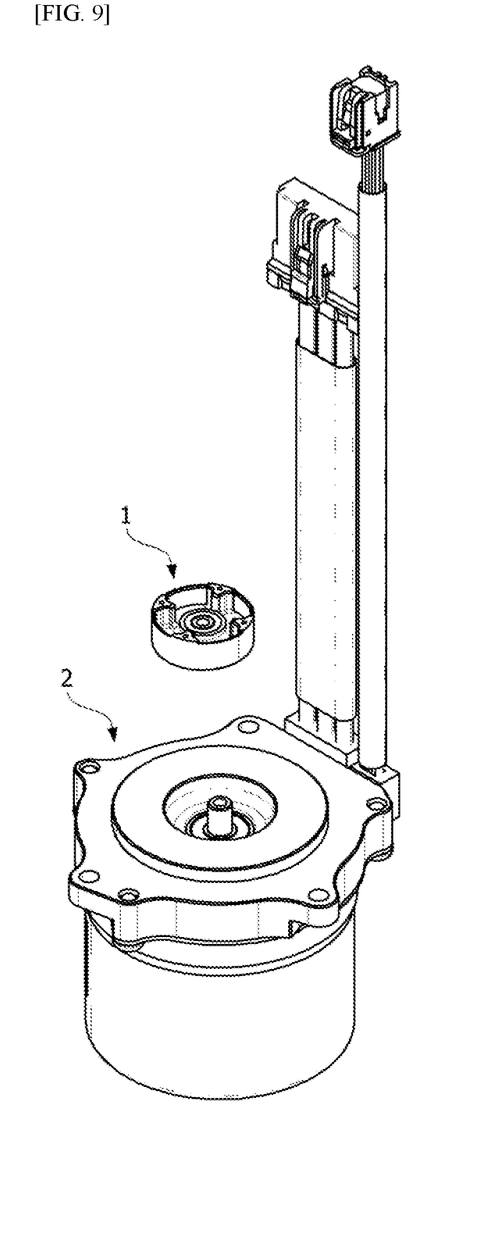
FIG. 9 is an exploded perspective view of a motor assembly including a coupler according to another embodiment of the present invention.
Figure 10:
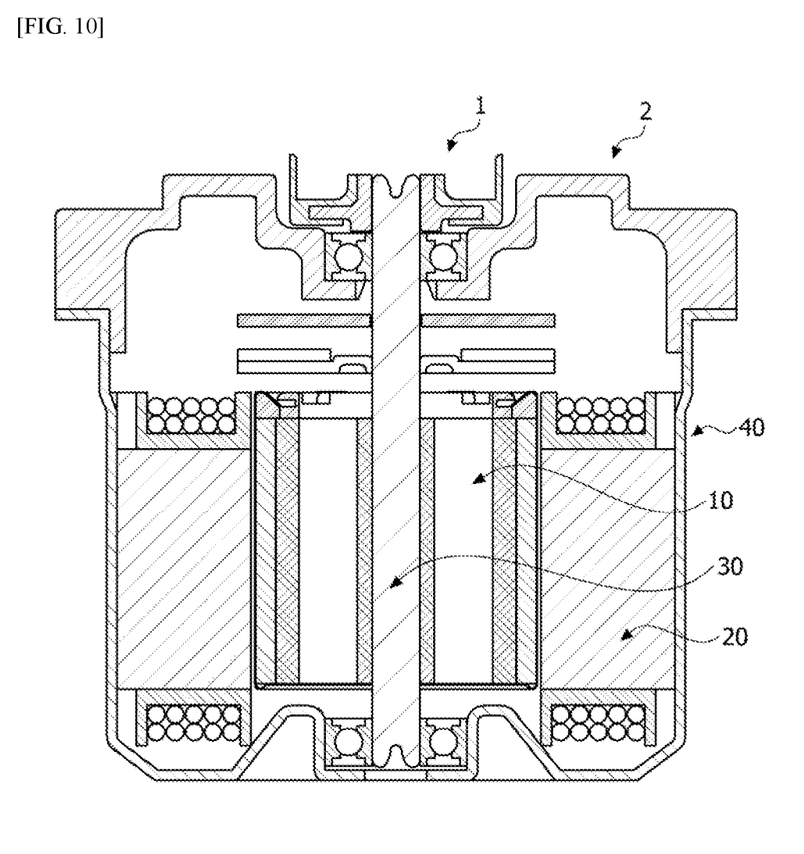
FIG. 10 is a cross-sectional view of the motor assembly to which the coupler is coupled.

FIG. 9 is an exploded perspective view of a motor assembly including a coupler according to another embodiment of the present invention, and FIG. 10 is a cross-sectional view of the motor assembly to which the coupler is coupled. In FIGS. 9 and 10, reference numerals the same as those in FIGS. 1 to 8 show the same members and detailed descriptions thereof will be omitted.

A motor assembly 2 according to another embodiment of the present invention may include a rotary shaft 30, a rotor 10 including a hole in which the rotary shaft 30 is disposed, a stator 20 disposed at an outer side of the rotor 10, a housing 40 configured to accommodate the rotor 10 and the stator 20, and a coupler 1 coupled to the rotary shaft 30.

The rotor 10 is disposed in the stator 20. The rotor 10 may include a rotor core and a magnet coupled to the rotor core.

The rotor 10 may be classified into the following types according to a coupling method between the rotor core and the magnet.

The rotor 10 may be implemented as a type in which the magnet is coupled to an outer circumferential surface of the rotor core. In the above-type rotor 10, a separate can member may be coupled to the rotor core to prevent separation of the magnet and increase a coupling force. Alternatively, the magnet and the rotor core may be integrally formed by double injection.

The rotor 10 may be implemented as a type in which the magnet is coupled to the inside of the rotor core. In the above-type rotor 10, a pocket into which the magnet is inserted into the rotor core may be provided.

The rotor core of the rotor 10 may be formed by laminating a plurality of sheet-shaped plates.

The rotor 10 may be formed in a shape in which a plurality of pucks forming a skew angle are stacked.

The stator 20 causes electric interaction with the rotor 10 to induce rotation of the rotor 10. A coil may be wound around the stator 20 to cause the interaction between the stator 20 and the rotor 10. A specific configuration of the stator 20 on which the coil is wound will be described below.

The stator 20 may include a stator core including a plurality of teeth. The stator core may be provided with a ring-shaped yoke portion, and the teeth on which coils are wound may be provided on an outer circumferential surface of the yoke portion. The teeth may be provided at a predetermined interval along the outer circumferential surface of the yoke portion. Meanwhile, the stator core may be formed by laminating a plurality of thin sheet-shaped plates. Further, the stator core may be formed of a plurality of divided cores coupled or connected to each other.

The rotary shaft 30 may be coupled to the rotor 10. When the electric interaction between the rotor 10 and the stator 20 occurs due to current supply, the rotor 10 rotates, and accordingly, the rotary shaft 30 rotates. The rotary shaft 30 may be connected to a steering shaft of a vehicle to transfer power to the steering shaft. The rotary shaft 30 may be supported by a bearing.

The housing 40 may be formed in a cylindrical shape, and the stator 20 may be coupled to an inner wall of the housing 40. An upper portion of the housing 40 may be implemented in an open state and a lower portion of the housing 40 may be implemented in a closed state. A pocket part configured to accommodate the bearing supporting a lower portion of the rotary shaft 30 may be provided in the lower portion of the housing 40. A bracket may be coupled to the open upper portion of the housing 40. The bracket may also be provided with a pocket part configured to support an upper portion of the rotary shaft 30. Further, the bracket may include a hole or a groove into which a connector, to which an external cable is connected, is inserted.

The coupler 1 may be coupled to an end portion of the rotary shaft 30 to transfer a rotating force of the motor. The above embodiments may be used in the coupler 1.

As described above, the motor according to one embodiment of the present invention has been examined with reference to the accompanying drawings.

The above description is only an exemplary description of the technical spirit of the present invention, and various changes, various modifications, changes, and substitutions of the present invention may be performed by those skilled in the art within essential characteristics of the embodiments. Accordingly, the disclosed embodiments and the accompanying drawings of the present invention are not for the purpose of limitation but are for describing the technical spirit of the present invention, and the scope of the technical spirit of the present invention is not limited by the embodiments and the accompanying drawings. The scope of the present invention should be interpreted by the claims which will be described below, and the equivalents should be interpreted as being included in the claims of the present invention.

REFERENCE NUMERALS

1: coupler, 2: motor assembly, 10: rotor, 20: stator, 30: rotary shaft, 40: housing, 100: inner insertion part, 110: plate, 112: connection groove, 130: protruding part, 131: through surface, 132a: gear teeth, 132b: screw thread, 150: through hole, 200: outer support part, 210: accommodation part, 220: outer wall, 230: projection part, 232: inclined portion, 234: groove part, 240: outer protruding part

The invention claimed is:

1. A coupler comprising:
an inner insertion part having an aperture extending in an axial direction; and
an outer support part surrounding and contacting a portion of an outer surface of the inner insertion part that faces the axial direction,
wherein the inner insertion part includes:
a cylindrical-shaped protruding part having the aperture disposed at a center thereof; and
a polygonal-shaped plate configured to extend in a radial direction from an outer circumferential surface of the protruding part,
wherein the outer support part includes:
an accommodation part coupled to the plate;
a cylindrical outer wall configured to extend from an edge of the accommodation part;
an outer protruding part in contact with the protruding part of the inner insertion part; and
a plurality of projection parts extending axially from a first end of the outer support part toward a second end of the outer support part, the plurality of projection parts extending toward the protruding part of the inner insertion part from an inner side of the outer wall,
wherein the outer protruding part has a surface that is substantially flush with a surface of the protruding part of the inner insertion part,
wherein the plate includes a plurality of connection grooves, and
wherein the accommodation part is disposed in the connection grooves.

2. The coupler of claim 1, wherein a polygonal structure of the plate is provided in a polygonal shape having a multiple of the number of the plurality of projection parts.

3. The coupler of claim 2, wherein an outermost point of the plate is located under and overlaps the plurality of projection parts.

4. The coupler of claim 1, wherein:
wherein linear gear teeth are formed on the through surface.

5. The coupler of claim 1, wherein:
a spiral screw thread is formed on the through surface.

6. The coupler of claim 1, wherein the plurality of projection parts are disposed at even intervals on the outer support part.

7. The coupler of claim 1, wherein an upper surface of each of the plurality of projection parts has an inclined portion which is inclined downward towards the plate.

8. The coupler of claim 7, wherein a side surface of each of the plurality of projection parts is formed of an involute curve.

9. The coupler of claim 1, wherein:
the inner insertion part is manufactured by a forging method; and
the outer support part is manufactured by an injection method.

10. The coupler of claim 1, wherein the plurality of projection parts are configured to be coupled to a component that applies torque to the plurality of projection parts.

11. The coupler of claim 1, wherein the plate is spaced from axial ends of the protruding part of the inner insertion part.

12. A motor assembly comprising:
a rotary shaft;
a rotor including a hole in which the rotary shaft is disposed;
a stator disposed at an outer sides of the rotor;
a housing configured to accommodate the rotor and the stator; and
a coupler coupled to the rotary shaft,
wherein the coupler includes:
an inner insertion part having an aperture extending in an axial direction; and
an outer support part surrounding an outer surface of the inner insertion part that faces the axial direction,
wherein the inner insertion part includes:
a cylindrical-shaped protruding part having the aperture disposed at a center thereof; and
a polygonal-shaped plate configured to extend in a radial direction from an outer circumferential surface of the protruding part,
wherein the outer support part includes:
an accommodation part coupled to the plate;
a cylindrical outer wall configured to extend from an edge of the accommodation part;
an outer protruding part in contact with the protruding part of the inner insertion part; and
a plurality of projection parts extending axially from a first end of the outer support part toward a second end of the outer support part, and the plurality of projection parts extending toward the protruding part of the inner insertion part from an inner side of the outer wall,
wherein the outer protruding part has a surface that is substantially flush with a surface of the protruding part of the inner insertion part,
wherein the plate includes a plurality of connection grooves, and
wherein the accommodation part is disposed in the connection grooves.

13. The motor assembly of claim 12, wherein an upper surface of each of the plurality of projection parts has an inclined portion which is inclined downward towards the plate.

14. The motor assembly of claim 12, wherein the plurality of projection parts are configured to be coupled to a component that applies torque to the plurality of projection parts.

15. The motor assembly of claim 12, wherein the plate is spaced from axial ends of the protruding part of the inner insertion part.

* * * * *